United States Patent
Kim et al.

(10) Patent No.: US 11,315,283 B1
(45) Date of Patent: Apr. 26, 2022

(54) METHOD AND SYSTEM FOR OBJECT DETECTION AND POSTURE ESTIMATION BASED ON OBJECT-CUSTOMIZED IMAGE FEATURE DETECTION ALGORITHM

(71) Applicant: VIRNECT inc., Seoul (KR)

(72) Inventors: Ki Young Kim, Seoul (KR); Yeon Jo Kim, Seoul (KR); Noh Young Park, Paju-si (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 17/553,502

(22) Filed: Dec. 16, 2021

(30) Foreign Application Priority Data

Dec. 16, 2020 (KR) .......................... 10-2020-0176144

(51) Int. Cl.
*G06V 10/40* (2022.01)
*G06T 7/73* (2017.01)
*G06T 19/00* (2011.01)
*G06T 7/246* (2017.01)

(52) U.S. Cl.
CPC .............. *G06T 7/73* (2017.01); *G06T 7/246* (2017.01); *G06T 19/006* (2013.01); *G06V 10/40* (2022.01); *G06T 2207/20081* (2013.01)

(58) Field of Classification Search
CPC ......... G06T 7/73; G06T 7/246; G06T 19/006; G06T 2207/20081; G06V 10/40; G06V 10/44; G06V 10/42; G06V 40/171; G06V 40/193

See application file for complete search history.

(56) References Cited

U.S. PATENT DOCUMENTS

| | | | | |
|---|---|---|---|---|
| 8,755,630 | B2* | 6/2014 | Hwang | G06V 20/647 382/276 |
| 9,031,317 | B2* | 5/2015 | Yakubovich | G06K 9/6256 382/159 |
| 10,304,248 | B2* | 5/2019 | Woo | G06T 7/593 |
| 11,107,239 | B2* | 8/2021 | Wang | G06V 40/10 |
| 2012/0114175 | A1* | 5/2012 | Hwang | G06T 7/74 382/103 |

(Continued)

FOREIGN PATENT DOCUMENTS

| | | |
|---|---|---|
| KR | 20120048370 A | 5/2012 |
| KR | 20160001699 A | 1/2016 |
| KR | 20200135998 A | 12/2020 |

*Primary Examiner* — Ian L Lemieux
(74) *Attorney, Agent, or Firm* — STIR Law Group, LLC

(57) ABSTRACT

A system for object detection and posture estimation based on an object-customized image feature detection algorithm according to an embodiment of the present disclosure comprises at least one or more processors; and at least one or more memories, wherein at least one application, as an application that is stored in the memory and performs object detection and posture estimation based on an object-customized image feature detection algorithm by being executed by the at least one or more processors, learns a goal object based on a plurality of image feature detection algorithms, generates an algorithm list that includes evaluation of the plurality of image feature detection algorithms for detecting the learned goal object, detects a target object corresponding to the goal object among at least one or more candidate objects within an input image based on the generated algorithm list, and performs a posture estimation process for the detected target object based on the generated algorithm list.

13 Claims, 5 Drawing Sheets

(56) References Cited

U.S. PATENT DOCUMENTS

| 2015/0116355 | A1* | 4/2015 | Hofmann | G06T 19/006 |
| | | | | 382/103 |
| 2021/0073890 | A1* | 3/2021 | Lee | G06K 9/6271 |

* cited by examiner

METHOD AND SYSTEM FOR OBJECT DETECTION AND POSTURE ESTIMATION BASED ON OBJECT-CUSTOMIZED IMAGE FEATURE DETECTION ALGORITHM

CROSS-REFERENCE TO RELATED APPLICATIONS

This application claims the priority of the Korean Patent Applications NO 10-2020-0176144 filed on Dec. 16, 2020, in the Korean Intellectual Property Office, the disclosure of which is incorporated herein by reference.

BACKGROUND OF THE DISCLOSURE

Field of the Disclosure

The present disclosure relates to a method and a system for object detection and posture estimation based on an object-customized image feature detection algorithm. More particularly, the present disclosure relates to a method and a system that learn an image feature detection algorithm optimized for a predetermined object and perform real-time object detection and posture estimation within an input image based on the learned algorithm.

Related Art

Computer Vision is one of the latest research fields in computer science that studies the area of machine vision and aims to program a computer to "understand" a scene or features from particular images.

Methods in the field of computer vision are applied to various areas such as detection of a desired object based on feature data obtained from an image, estimation or tracking of the posture of a detected object, and place recognition or image stitching by analyzing similarity between objects. The importance of computer vision is growing day by day.

Examples of the image feature data include features and binary descriptors based on image corner points, the histogram of oriented gradients (HOG), and feature points based on a predetermined region in the image.

When detecting an object in an image or estimating posture based on image features, it should be noted that the respective image features have their own advantages and disadvantages in terms of accuracy, robustness, operation speed, or data throughput. Therefore, the image features should be appropriately used according to the characteristics of a target object.

However, in the prior art, an image feature technique optimized for a predetermined object is determined manually based on the user's knowledge, and validation of the determination is also made by the user's subjective judgement.

Therefore, in the prior art, reliability of an image processing result may be degraded in some cases, and there is a problem that image processing also takes a significant time.

On the other hand, it is very common for a single program (application) to perform predetermined image processing (for example, object detection or posture estimation) based on a single image feature.

Thus, in the prior art, when the image feature algorithm is modified to the characteristics of an object to which the algorithm is to be applied, problems occur in that a separate algorithm design is required, and a process of determining image features suitable for the object is impaired in terms of real-time performance.

PRIOR ART REFERENCES

[Patents]
(Patent 1) KR 10-2016-0001699 A

SUMMARY

The present disclosure provides a method and a system for object detection and posture estimation based on an object-customized image feature detection algorithm that learn an image feature detection algorithm optimized for a predetermined object and perform real-time object detection and posture estimation within an input image based on the learned algorithm.

Also, the present disclosure provides a method and a system for object detection and posture estimation based on an object-customized image feature detection algorithm that modify an image feature detection method in real-time according to various objects based on the learned algorithm and perform the object detection and posture estimation within the input image.

Technical objects to be achieved by the present disclosure and embodiments according to the present disclosure are not limited to the technical objects described above, and other technical objects may also be addressed.

A system for performing object detection and posture estimation based on an object-customized image feature detection algorithm according to an embodiment of the present disclosure comprises at least one or more processors; and at least one or more memories, wherein at least one application, as an application that is stored in the memory and performs object detection and posture estimation based on an object-customized image feature detection algorithm by being executed by the at least one or more processors, learns a goal object based on a plurality of image feature detection algorithms, generates an algorithm list that includes evaluation of the plurality of image feature detection algorithms for detecting the learned goal object, detects a target object corresponding to the goal object among at least one or more candidate objects within an input image based on the generated algorithm list, and performs a posture estimation process for the detected target object based on the generated algorithm list.

At this time, the image feature detection algorithm analyzes a pattern of the goal object and selectively learns local image feature points and image feature point descriptors based on the appearance of the goal object.

Also, the application learns the goal object by performing a utility evaluation process based on the plurality of image feature detection algorithms and the goal object.

Also, the utility evaluation is a process for determining, based on each image feature detection algorithm, whether the number of image features obtained when the object detection process and the posture estimation process based on the goal object are performed and the distribution of the image features satisfy a predetermined criterion.

Also, when the number of image features and the distribution of the image features satisfy a predetermined criterion, the application determines an image feature detection algorithm satisfying the predetermined criterion as a utility algorithm for the goal object.

As the number of image features increases and the distribution of the image features becomes more uniform, the application determines the corresponding image feature detection algorithm as an algorithm with higher utility for the goal object.

Also, the application generates the algorithm list by storing at least one or more utility algorithms determined as having utility for the goal object sequentially according to a predetermined criterion.

Also, the application generates the algorithm list by sequentially storing the utility algorithms based on at least one criterion between computational speed and amount of computations.

Also, the application performs the object detection process by sequentially retrieving the at least one or more utility algorithms within the algorithm list.

Also, when a first utility algorithm that performs an object detection process first from the algorithm list does not detect the target object, the application re-performs the object detection process based on the next-order utility algorithm after the first utility algorithm within the algorithm list.

Also, the posture estimation process measures rotation and translation motion elements of the target object moving in the three-dimensional space based on at least one or more of a reference point of the target object, the position of the reference point, and 6 degrees of freedom (DoF) posture.

Also, the application performs a posture verification process that verifies a result of the posture estimation process, performs a predetermined process according to the result of the posture verification process, and performs the posture estimation process based on a utility algorithm used when the object detection process is performed.

Also, when the result of the posture verification process satisfies a predetermined criterion, the application provides a virtual object that interacts and is augmented according to the posture of the target object obtained based on the posture estimation process.

Also, when the result of the posture verification process does not satisfy a predetermined criterion, the application re-performs the object detection process by retrieving, from the algorithm list, the next-order utility algorithm after a utility algorithm used to perform the object detection process.

A method and a system for object detection and posture estimation based on an object-customized image feature detection algorithm according to an embodiment of the present disclosure learn an image feature detection algorithm optimized for a predetermined object and thus, perform image processing on the object within an input image based on an image feature extraction technique optimized for the corresponding object.

Also, a method and a system for object detection and posture estimation based on an object-customized image feature detection algorithm according to an embodiment of the present disclosure may perform data processing quickly based on automated analysis of objects within an input image by performing real-time object detection and posture estimation within the input image based on the learned algorithm, thereby improving accuracy and reliability of the data processing.

Also, a method and a system for object detection and posture estimation based on an object-customized image feature detection algorithm according to an embodiment of the present disclosure may guarantee accuracy and real-time operation of the detection even if a target object changes in real-time within an input image and also improve the corresponding detection rate by performing object detection and posture estimation within the input image by changing the image feature detection method in real-time according to various objects based on the learned algorithm, thereby improving the processing efficiency of a computer vision algorithm.

The technical effects of the present disclosure are not limited to the technical effects described above, and other technical effects not mentioned herein may be understood clearly from the description below.

DESCRIPTION OF EXEMPLARY EMBODIMENTS

Figure 1:
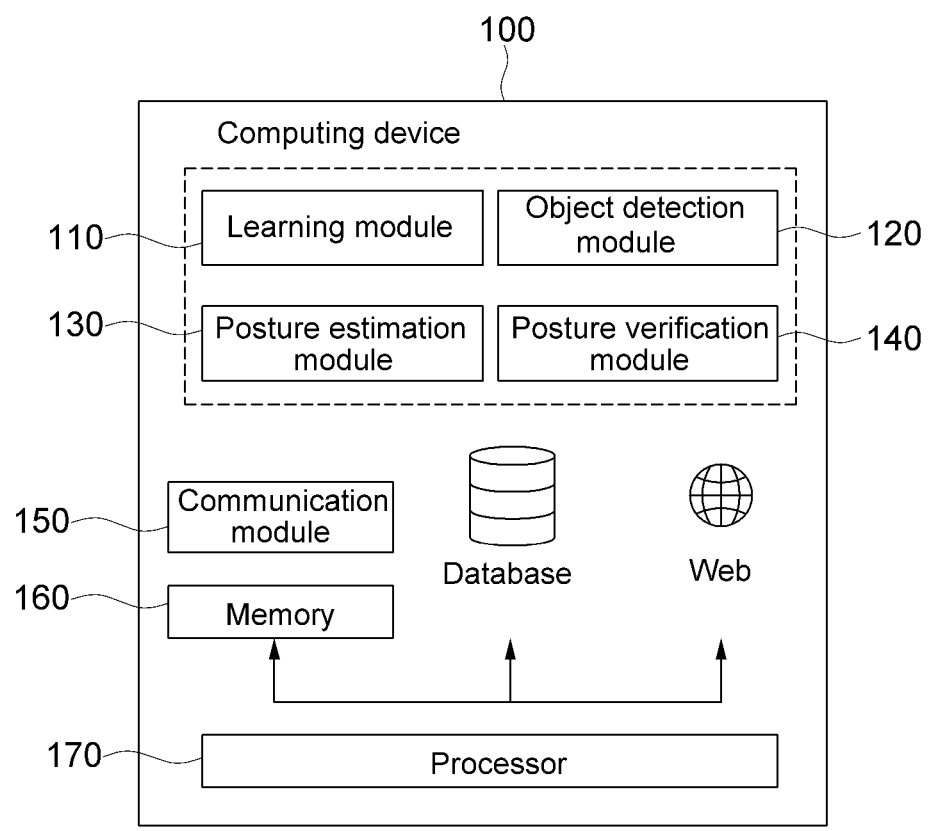
FIG. 1 illustrates an internal block diagram of a computing device that performs object detection and posture estimation based on an object-customized image feature detection algorithm according to an embodiment of the present disclosure.

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present disclosure; and should not be understood to preclude the possibility of adding one or more other features or constituting elements. Also, constituting elements in a figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the disclosure, the same or corresponding constituting element is assigned the same reference number, and repeated descriptions thereof will be omitted.

A system for object detection and posture estimation based on an object-customized image feature detection algorithm according to an embodiment of the present disclosure (hereinafter, an image feature detection system) may provide an object-customized posture estimation service that detects an object within an input image based on an object-customized image feature detection algorithm (hereinafter, an image feature detection algorithm) and performs posture estimation based on the corresponding object.

Specifically, an image feature detection system according to an embodiment may provide an image feature detection algorithm learning service that learns an image feature detection algorithm optimized for each object based on an object-customized posture estimation service.

Also, an image feature detection system according to an embodiment may provide an object detection service that detects, based on an object-customized posture estimation service, an object corresponding to at least one of the objects learned by the algorithm based on the learned image feature detection algorithm from among at least one or more objects within an input image.

Also, an image feature detection system according to an embodiment may provide, based on an object-customized posture estimation service, a posture estimation service that performs posture estimation on an object detected from an input image (in the embodiment, 6 degrees of freedom posture) based on the learned image feature detection algorithm.

According to an embodiment of the present disclosure, an image feature detection system that implements the object-customized posture estimation service described above may be realized based on a computing device.

In what follows, a computing device that implements an image feature detection system will be described in detail with reference to appended drawings.

Computing Device 100

FIG. 1 illustrates an internal block diagram of a computing device that performs object detection and posture estimation based on an object-customized image feature detection algorithm according to an embodiment of the present disclosure.

Referring to FIG. 1, a computing device 100 according to an embodiment of the present disclosure may be a predetermined computing device installed with an object-customized posture estimation application (in what follows, a posture estimation application) providing an object-customized posture estimation service.

Specifically, from a hardware point of view, the computing device 100 may include a mobile-type computing device and/or a desktop-type computing device installed with a posture estimation application.

Here, the mobile-type computing device may be a mobile device such as a smartphone or a tablet PC.

For example, the mobile-type computing device may include a smartphone, a mobile phone, a digital broadcast terminal, a personal digital assistant (PDA), a portable multimedia player (PMP), and a tablet PC.

Also, the desktop-type computing device may include a device installed with a program for executing an object-customized posture estimation service based on wired/wireless communication, such as a personal computer like a fixed-type desktop PC, a laptop computer, and an ultrabook installed with a posture estimation application.

Meanwhile, from a functional point of view, the computing device 100 may be implemented by including a plurality of modules.

Specifically, the computing device 100 according to an embodiment may include a learning module 110, an object detection module 120, a posture estimation module 130, a posture verification module 140, a communication module 150, a memory 160, and a processor 170.

<Learning Module 110>

The learning module 110 according to the embodiment of the present disclosure may analyze the pattern of an input object (a goal object according to the embodiment) and selectively learn local image feature points and image feature point descriptors suitable for the appearance of the corresponding object.

In other words, the learning module 110 according to the embodiment may learn an image feature detection algorithm optimized for an input object.

At this time, to learn an image feature detection algorithm optimized for each input object, the learning module 110 according to the embodiment may perform utility evaluation based on the corresponding object and at least one or more image feature detection algorithms (which includes a plurality of algorithms comprising a first to third image feature detection algorithms according to the embodiment).

Here, the utility evaluation according to the embodiment may be a process that determines whether it is possible to quickly and accurately implement a process in which each of at least one or more image feature detection algorithms detects an object (a target object according to the embodiment) corresponding to a predetermined object (a first goal object according to the embodiment) from an input image and performs posture estimation on the detected object. Detailed descriptions of the utility evaluation will be given later.

Also, the learning module 110 according to the embodiment may generate an algorithm list for an input object based on at least one or more image feature detection algorithms trained for the corresponding object.

Here, an algorithm list according to the embodiment may be a list sequentially storing at least one or more image feature detection algorithms (utility algorithms according to the embodiment) determined as having utility for an input object (a goal object according to the embodiment) from utility evaluation based on a plurality of image feature detection algorithms applied on the input object.

<Object Detection Module 120>

The object detection module 120 according to the embodiment of the present disclosure may detect, among at least one or more objects (candidate objects according to the embodiment) within an input image, a target object corresponding to a goal object (for example, a predetermined marker, a pen, or a part of the human body (for example, hand)) for which posture estimation is to be performed.

Specifically, the object detection module 120 according to the embodiment may detect a target object corresponding to the goal object among at least one or more candidate objects in the input image based on the algorithm list of the goal object.

At this time, the object detection module 120 according to the embodiment may detect a target object from the input image based on at least one or more image feature detection algorithms stored in the algorithm list. Detailed descriptions thereof will be provided later.

<Posture Estimation Module 130>

The posture estimation module 130 according to the embodiment of the present disclosure may perform a posture estimation process for a target object detected from an input image.

Here, the posture estimation according to the embodiment may refer to a process that measures rotational and translational motion elements of a predetermined object moving in the three-dimensional space based on a reference point, the position of the reference point, and/or 6 degrees of freedom (6 DoF) posture of the object.

The posture estimation module 130 according to the embodiment may perform posture estimation for a target object within an input image based on the image feature detection algorithm used for detection of the corresponding target object and perform posture estimation by obtaining the three-dimensional position and 6 DoF posture of the target object.

<Posture Verification Module 140>

The posture verification module 140 according to the embodiment of the present disclosure may perform a posture verification process for determining whether the accuracy of posture estimation performed on a target object satisfies a predetermined criterion.

Specifically, the posture verification module 140 according to the embodiment may perform a re-projection error calculation process based on a posture estimation result and/or an outlier (that is, a feature point causing a matching error) ratio calculation process.

Also, the posture verification module 140 may perform posture verification that determines whether the accuracy of a posture estimation result of a target object satisfies a predetermined standard (for example, a preconfigured value) based on the calculation process performed as described above.

According to the embodiment of the present disclosure, the estimated posture of a target object is verified based on the re-projection error calculation process and/or the outlier (that is, a feature point causing a matching error) ratio calculation process. However, the embodiment is only an example, and the embodiment of the present disclosure does not limit the algorithm itself for verifying an estimated posture of a target object.

<Communication Module 150>

The communication module 150 according to the embodiment of the present disclosure may transmit and receive various types of data and/or information for providing an object-customized posture estimation service.

The communication module 150 according to the embodiment may exchange data (for example, an input image) related to the object-customized posture estimation service by performing wired/wireless communication with an external computing device 100 (for example, a camera system, an external computing device, and/or a web server).

The communication module 150 may transmit and receive wireless signals to and from at least one of a base station, an external terminal, and a particular server on a mobile communication network constructed according to the technology standards or communication methods (for example, Global System for Mobile communication (GSM), Code Division Multi-Access (CDMA), High-Speed Downlink Packet Access (HSDPA), High-Speed Uplink Packet Access (HSUPA), Long Term Evolution (LTE), or Long Term Evolution-Advanced (LTE-A)) for mobile communication.

Also, the communication module 150 may transmit and receive wireless signals through wireless communication methods such as Wireless LAN (WLAN), Wireless-Fidelity (Wi-Fi), Wi-Fi Direct, Digital Living Network Alliance (DLNA), Wireless Broadband (WiBro), and World Interoperability for Microwave Access (WiMAX).

Also, the communication module 150 may transmit and receive wireless signals through a short-range wireless communication method. For example, the communication module 150 may support short-range communication using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, and Wireless Universal Serial Bus (USB) technologies.

<Memory 160>

The memory 160 according to the embodiment of the present disclosure may store and manage one or more of an operating system (OS), various application programs, applications, data, and commands for providing an object-customized posture estimation service.

The memory 160 according to the embodiment may store and manage an image feature detection algorithm, a utility evaluation algorithm, an algorithm list for each goal object, an input image, a target object detection algorithm, target object information, a posture estimation algorithm, posture estimation information, a posture verification algorithm, and/or posture verification information.

Also, the memory 160 according to the embodiment may provide various data related to an object-customized posture estimation service in conjunction with an external database (for example, a database of a web server) capable of providing an input image.

Also, the memory 160 according to the embodiment may include a program area and a data area.

Here, the program area according to the embodiment may be linked between an operating system (OS) for booting the computing device 100 and functional elements. The data area may store data generated according to the use of the computing device 100.

The memory 160 may be one of various storage devices, such as a ROM, a RAM, an EPROM, a flash drive, and a hard drive, or web storage that performs a storage function of the memory 160 on the Internet. Also, the memory 160 may be a recording medium detachable from the computing device 100.

<Processor 170>

The processor 170 according to the embodiment of the present disclosure may control the overall operation of each unit described above to implement an object-customized posture estimation service.

The processor 170 may be a system-on-a-chip (SOC) suitable for the computing device 100 including a central processing unit (CPU) and/or a graphics processing unit (GPU), execute an operating system (OS) stored in the memory 160 and/or an application program, and control each constituting element installed in the computing device 100.

Also, the processor 170 may communicate internally with each constituting element through a system bus and may include one or more predetermined bus structures including a local bus.

Also, the processor 170 may be implemented using at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electrical units for performing other functions.

The computing device 100 including the constituting elements described above according to the embodiment of the present disclosure may comprise at least one or more of the learning module 110, the object detection module 120, the posture estimation module 130, and the posture verification module 140, and/or the communication module 150 and may include one or more processors 170 for data processing and at least one or more memories 160 storing various application programs, data, and/or instructions for providing an object-customized posture estimation service.

Method for Object Detection and Posture Estimation Based on an Object-Customized Image Feature Detection Algorithm In what follows, a method for detecting a predetermined object from an input image based on an object-customized image feature detection algorithm and estimating the posture of the detected object by a posture estimation application executed by the computing device 100 will be described in detail with reference to FIGS. 2 to 6.

Figure 2:
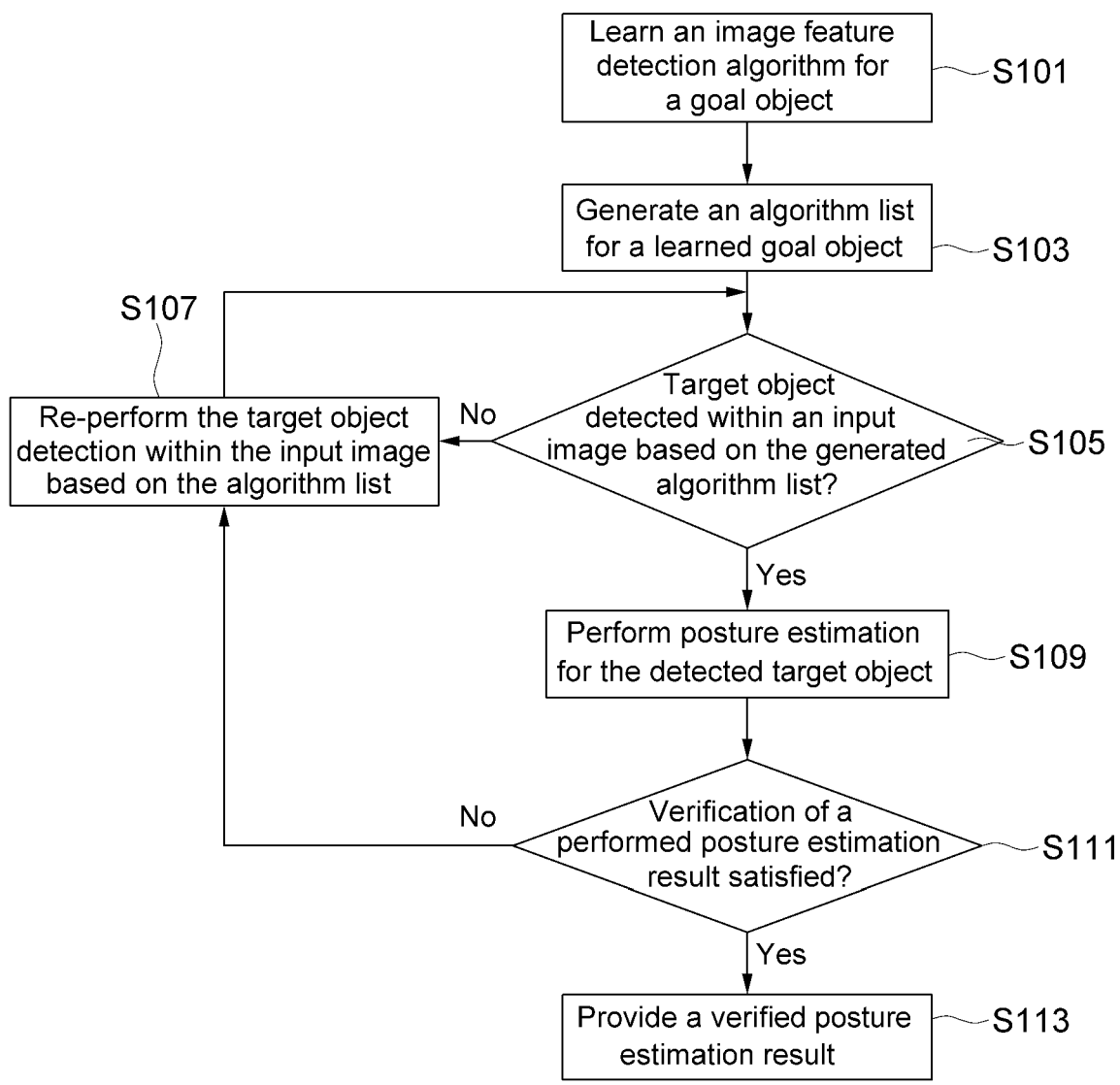
FIG. 2 is a flow diagram illustrating a method for object detection and posture estimation based on an object-customized image feature detection algorithm according to an embodiment of the present disclosure.

FIG. 2 is a flow diagram illustrating a method for object detection and posture estimation based on an object-customized image feature detection algorithm according to an embodiment of the present disclosure.

Referring to FIG. 2, the posture estimation application according to the embodiment may learn an image feature detection algorithm for a goal object.

Here, the goal object according to the embodiment may refer to an object learned by a customized image feature detection algorithm on an object-customized posture estimation service.

According to the embodiment, at least one object among at least one or more unspecified objects (candidate objects) within a predetermined input image may be detected as a target object based on the customized image feature detection algorithm trained for the goal object.

At this time, the target object according to the embodiment, which is an object operating as a means for performing a predetermined process (according to the embodiment, an object posture estimation process and/or a virtual object augmentation process), may interact according to the posture (according to the embodiment, 6 DoF posture) of the corresponding object and provide an augmented, virtual object according to the embodiment.

For example, the goal object and/or the target object may be a predetermined marker, a pen, and/or a part of the human body (for example, hand).

Also, the image feature detection algorithm according to the embodiment may be an algorithm that quickly and accurately implements a process for performing detection of an object (the target object in the embodiment) corresponding to the goal object from a predetermined input image and posture estimation of the detected object.

Specifically, the image feature detection algorithm according to the embodiment, which is a technique for extracting visual features having different types of local features, may be an algorithm that analyzes the pattern of an object input to the learning module 110 (trainer) according to the embodiment and selectively learns the local image feature points and image feature point descriptors suitable for the appearance of the corresponding object.

The image feature detection algorithm may detect a target object corresponding to a predetermined goal object among a plurality of objects (candidate objects according to the embodiment) existing in a predetermined input image and perform posture estimation for the detected target object.

In the embodiment, the posture estimation application may learn at least one or more image feature detection algorithms corresponding to the respective goal objects.

Specifically, the posture estimation application according to the embodiment may learn an image feature detection algorithm for a goal object based on a plurality of algorithms including at least one or more of a first image feature detection algorithm (in what follows, a first algorithm), a second image feature detection algorithm (in what follows, a second algorithm), and a third image feature detection algorithm (in what follows, a third algorithm).

In what follows, it is assumed that the posture estimation application learns an image feature detection algorithm for a goal object based on a plurality of algorithms including the first to third algorithms; however, the assumption is only an example, and various embodiments may be applied in a way that learning of an algorithm for each goal object is performed based on a plurality of algorithms comprising a fewer number of algorithms or further including an n-th image feature detection algorithm.

At this time, the plurality of algorithms according to the embodiment may be implemented based on the first to third algorithms implemented differently based on different speeds, accuracies, and/or amounts of computations (data throughput).

Specifically, as the plurality of algorithms according to the embodiment go from the first algorithm to the second algorithm and then from the second algorithm to the third algorithm, the speed of the image feature detection process performed based on the corresponding algorithm is slowed down; thus, the plurality of algorithms may be implemented using different speeds.

Also, since the accuracy of the image feature detection process improves from the first algorithm to the third algorithm, the plurality of algorithms may be implemented using different accuracies.

Also, since the number of computations (data throughput) for performing the corresponding process increases from the first to the third algorithm, the plurality of algorithms may be implemented to perform the process with different amounts of computations.

More specifically, in the embodiment, the first algorithm may perform the image feature detection process with the fastest speed among the first to third algorithms.

In other words, the first algorithm according to the embodiment may extract a large number of features compared to the time required for feature extraction within an input image.

However, the first algorithm according to the embodiment may exhibit low accuracy and weak robustness compared to other algorithms and may require a large amount of computations (data throughput).

For example, the first algorithm may be a feature and binary descriptor-based image feature detection algorithm based on corner points that may be detected within an input image.

Such a corner point-based image feature detection algorithm may be used often because the algorithm takes less time for feature extraction and may extract a large number of features. However, the algorithm may exhibit lower accuracy than other image feature detection algorithms. When the input image has few patterns and exhibits low contrast of intensity, it may not be possible to extract a sufficient number of corner points, thus degrading the robustness and accuracy of the algorithm.

Meanwhile, the second algorithm according to the embodiment may provide higher accuracy than the first algorithm but may require a large number of computations and exhibit a lower speed.

On the other hand, the second algorithm may provide lower accuracy than the third algorithm but may be superior to the third algorithm in terms of the number of computations required and speed (namely, the second algorithm requires a smaller number of computations and exhibits a higher speed than the third algorithm).

For example, the second algorithm may be an image feature point-based image feature detection algorithm based on the histogram of oriented gradients (HOG) obtained from an input image.

The HOG-based image feature detection algorithm may provide higher performance in terms of accuracy and robustness compared to the corner point-based image feature detection algorithm described above and may extract more feature points even when it is difficult to extract a sufficient number of corner point features from an input image.

However, since the HOG-based image feature detection algorithm requires a large number of data computations compared to the corner point-based image feature detection algorithm, its real-time performance may deteriorate.

On the other hand, according to the embodiment, the third algorithm may perform the image feature detection process with the highest accuracy among the first to third algorithms.

However, the third algorithm according to the embodiment may show a lower data processing speed due to a large number of computations compared to other algorithms.

For example, the third algorithm may be a feature point-based image feature detection algorithm based on a predetermined region within an input image.

The region-based image feature detection algorithm may extract features over a wider region unit than the corner point-based and HOG-based image feature detection algorithms. Therefore, the region-based image feature detection algorithm may perform an image feature detection process based on more information than the first and second algorithms. However, the number of computations increases in proportion to the amount of information, and thus the region-based image feature detection algorithm may exhibit a lower processing speed.

As described above, the posture estimation application according to the embodiment may detect an image feature detection algorithm optimized for a goal object with various characteristics more accurately by learning the goal object based on a plurality of image feature detection algorithms having different quality and performance.

Also, through the learning, the posture estimation application may manage an image feature extraction algorithm optimized for a predetermined goal object by matching the algorithm to the goal object and may use the algorithm when performing image processing on the goal object within an input image.

Figure 3:
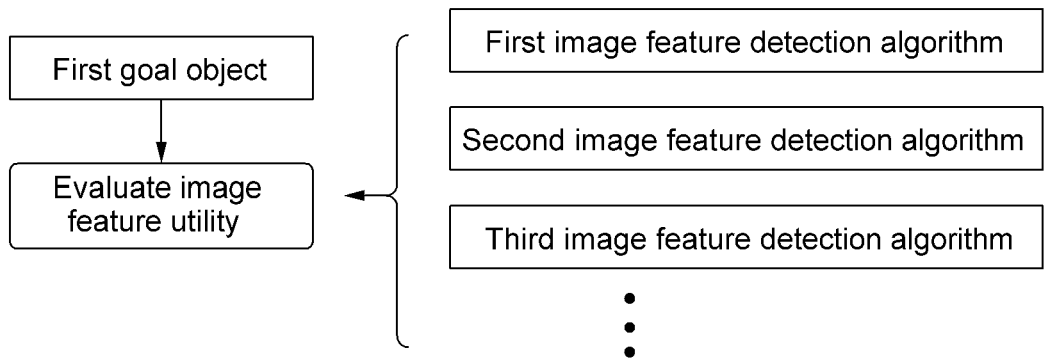
FIG. 3 illustrates a method for performing evaluation of image feature utility according to an embodiment of the present disclosure.

FIG. 3 illustrates a method for performing evaluation of image feature utility according to an embodiment of the present disclosure.

Referring to FIG. 3, the posture estimation application according to the embodiment may evaluate image feature utility based on a goal object and a plurality of algorithms to learn an image feature detection algorithm for the goal object based on a plurality of algorithms including the first to third algorithms.

Here, the utility evaluation according to the embodiment may refer to a process in which each of at least one or more image feature detection algorithms (the first to third algorithms according to the embodiment) detects an object (a target object according to the embodiment) corresponding to a predetermined, first goal object from an input image and determines whether it is possible to implement a process for performing posture estimation on the detected object quickly and accurately.

In other words, the utility evaluation according to the embodiment may refer to a process that determines whether the number of image features and the distribution thereof satisfy a predetermined criterion when an object detection process and a posture estimation process based on a first goal object are performed based on each image feature detection algorithm.

Specifically, the posture estimation application according to the embodiment may perform utility evaluation based on a plurality of algorithms that includes the first to third algorithms for each of at least one or more goal objects.

More specifically, to perform utility evaluation, the posture estimation application according to the embodiment may perform an image feature detection process for a predetermined input image based on the first goal object and one (in what follows, a target algorithm) of a plurality of algorithms including the first to third algorithms.

Also, the posture estimation application may evaluate the utility of the target algorithm for the first goal object based on the number of image features and the distribution thereof obtained as a result of the image feature detection process performed as described above.

Specifically, when the number of the obtained image features and the distribution thereof meet a predetermined criterion, the posture estimation application according to the embodiment may determine the corresponding target algorithm as a utility algorithm, which is an algorithm determined as having utility for the first goal object.

As the number of the obtained image features becomes larger and the distribution of the obtained image features becomes more uniform, the posture estimation application according to the embodiment may be determined as an algorithm having high utility.

In what follows, a specific method for performing utility evaluation will be described in more detail with reference to the equations below. Here, specific values for the variables in the equations may be set differently for each image feature.

Specifically, the posture estimation application may obtain the distribution of image features within a predetermined input image from an image feature detection process performed for utility evaluation.

More specifically, the posture estimation application may first partition the input image into g segments of equal sizes to obtain the distribution of image features.

Also, the posture estimation application may extract image features based on each image (an image bin, in what follows, a partitioned image) within the partitioned input image.

At this time, the number of image features $N_g$ to be extracted from each partitioned image is expressed by the following equation.

$$N_g = \frac{\text{The Number of features to be extracted from the whole image}}{\text{The total number of partitioned images}} = \frac{N}{g}$$

Also, the posture estimation application according to the embodiment compares the number of images features to be extracted from each partitioned image $N_g$ with the number of image features extracted from the partitioned image. When the number of image features extracted from the partitioned image is larger than the number of image features to be extracted from each partitioned image $N_g$, the posture estimation application may preferentially select an image feature with a higher score.

Afterward, the posture estimation application according to the embodiment may express the distribution of image features in a functional form based on the following equation.

$$\alpha = \sum_{i=1}^{g}\left(w_i * \frac{n_i}{N_g}\right)$$

In the equation above, $n_i$ represents the number of image features extracted from the i-th partitioned image within an input image, and $w_i$ represents a weight of the i-th partitioned image, where the weight is defined to satisfy $$\sum_{i=1}^{g} w_i = 1.$$

Therefore, according to the equation above, as the image features extracted from an input image are distributed more uniformly, α may be set to a higher value. For example, as the i-th partitioned image is located more closely to the center of the entire partitioned images, α may be set to a higher value. To this end, a method using a Gaussian distribution may be used.

Specifically, when the center coordinates of each partitioned image from the center of an input image are $(x_i, y_i)$, the following equation may be satisfied.

$$w_i = K * e^{\frac{-(x_i^2 + y_i^2)}{2\sigma}}$$

In the equation above, K is a normalizing coefficient that makes a sum $$\left(\sum_{i=1}^{g} w_i\right)$$

of $w_i$ equal to 1, and α may determine the deviation of the weights.

At this time, the posture estimation application according to the embodiment may set the number N of arbitrary image features to be extracted from the entire input image based on a predetermined method (for example, a user input and/or a built-in process).

And the posture estimation application, based on the total sum N of the numbers of image features extracted from the respective partitioned images within the input image, may calculate the number of image features b extracted from the input image by the following equation.

$$b = \frac{\sum_{i=1}^{g} n_i}{N}$$

Also, the posture estimation application according to the embodiment may obtain the final parameter C for utility evaluation based on the following equation that includes a weight $W_a$ and a weight $W_b$.

$$C = W_a * a + W_b * b$$

In the equation above, $0 < W_a, W_b < 1$, and $W_b = 1 - W_a$.

Also, when the value of the final parameter C obtained as above satisfies a predetermined criterion (for example, when the value is greater than or equal to a predetermined value), the posture estimation application according to the embodiment may determine that the image feature detection algorithm deriving the corresponding final parameter C has utility for the corresponding goal object.

To rephrase, the posture estimation application according to the embodiment may perform utility evaluation based on the method above and determine utility about whether it is possible to quickly and accurately implement a process in which each of at least one or more image feature detection algorithms (a plurality of algorithms including the first to third algorithms according to the embodiment) detects an object (a target object according to the embodiment) corresponding to the first goal object from a predetermined input image and posture estimation for the detected object is performed. Through the determination above, at least one or more utility algorithms determined as having utility for the first goal object may be obtained.

As described above, the posture estimation application according to the embodiment detects an object (a target object according to the embodiment) related to a predetermined goal object from an input image and detects an image feature detection algorithm of the goal object for performing posture estimation based on the process specified as above, thereby quickly and accurately obtaining the corresponding, object-customized image feature detection algorithm based on more objective and rational data.

Also, the posture estimation application according to the embodiment may generate an algorithm list for the goal object learned as described above S103.

Figure 4:
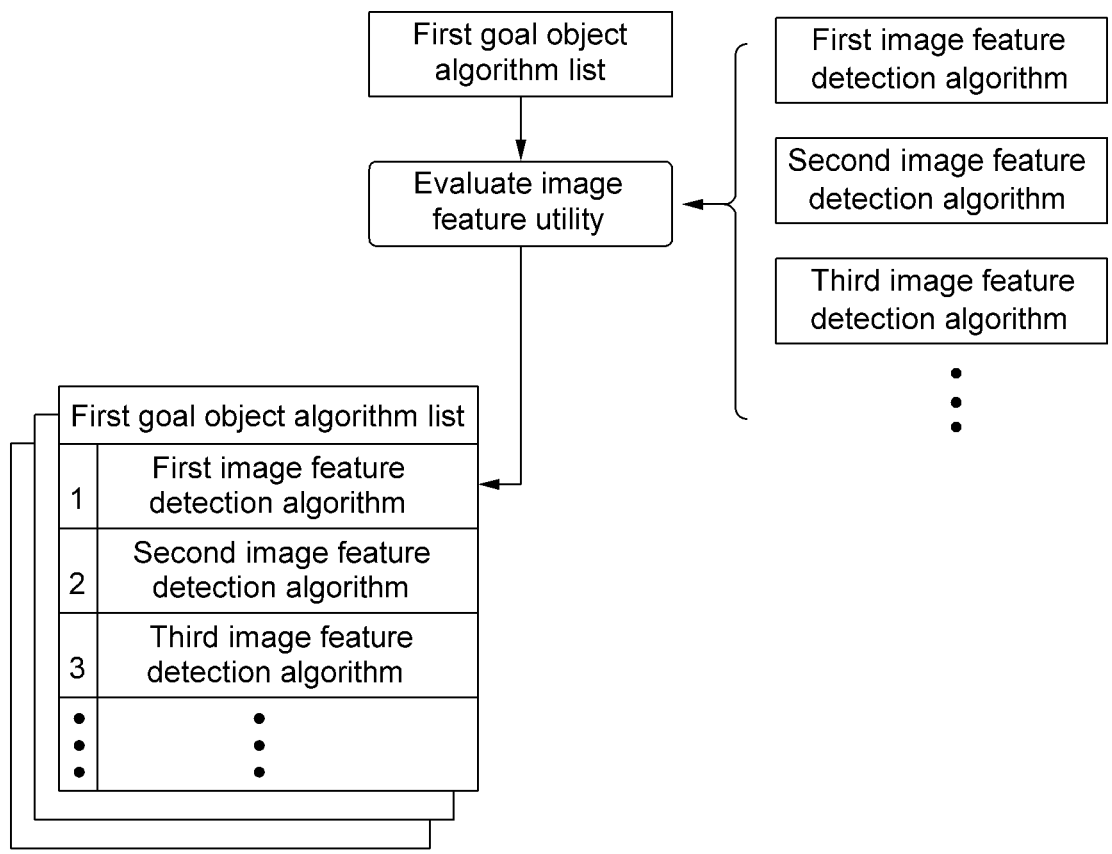
FIG. 4 illustrates an algorithm list according to an embodiment of the present disclosure.

FIG. 4 illustrates an algorithm list according to an embodiment of the present disclosure.

Referring to FIG. 4, the algorithm list according to the embodiment may be a list sequentially storing at least one or more utility algorithms determined as having utility for a first goal object from a result of utility evaluation based on the first goal object and a plurality of algorithms (which include a first to third algorithm according to the embodiment).

Specifically, the posture estimation application according to the embodiment may sequentially store at least one or more utility algorithms determined as having utility for the first goal object according to a predetermined criterion to generate an algorithm list for the first goal object.

Also, the posture estimation application may store and manage the generated algorithm list by matching the list to the first goal object.

At this time, the posture estimation application may generate an algorithm list that sequentially stores the at least one or more utility algorithms according to the predetermined criterion based on the order of computational speed and/or amount of computations (namely, the order of the first to third algorithms).

For example, when the utility algorithm for the first goal object includes a corner point-based image feature detection algorithm, a HOG-based image feature detection algorithm, and an area-based image feature detection algorithm, the posture estimation application generates an algorithm list for the first goal list by storing the plurality of utility algorithms in the algorithm list of the first goal object sequentially in the order of computational speed (in other words, in the order of the corner point-based image feature detection algorithm, the HOG-based image feature detection algorithm, and the area-based image feature detection algorithm).

As described above, the posture estimation application according to the embodiment may sequentially store at least one or more utility algorithms for the first goal object according to the predetermined criterion (in the embodiment, the order of computational speed and/or amount of computations) and thus, apply an image feature detection algorithm exhibiting a fast computational speed or requiring a small number of computations first when subsequently detecting an object from an input image and estimating the object's posture based on the corresponding algorithm list.

Also, since the posture estimation application manages the generated algorithm list by matching the list to the first goal object, the posture estimation application may proceed with a process in the order of algorithms better optimized to the first goal object and thus improve the performance of the process when subsequently detecting an object corresponding to the first goal object (a target object according to the embodiment) from a predetermined input image based on the first goal object and performing posture estimation of the object.

Figure 5:
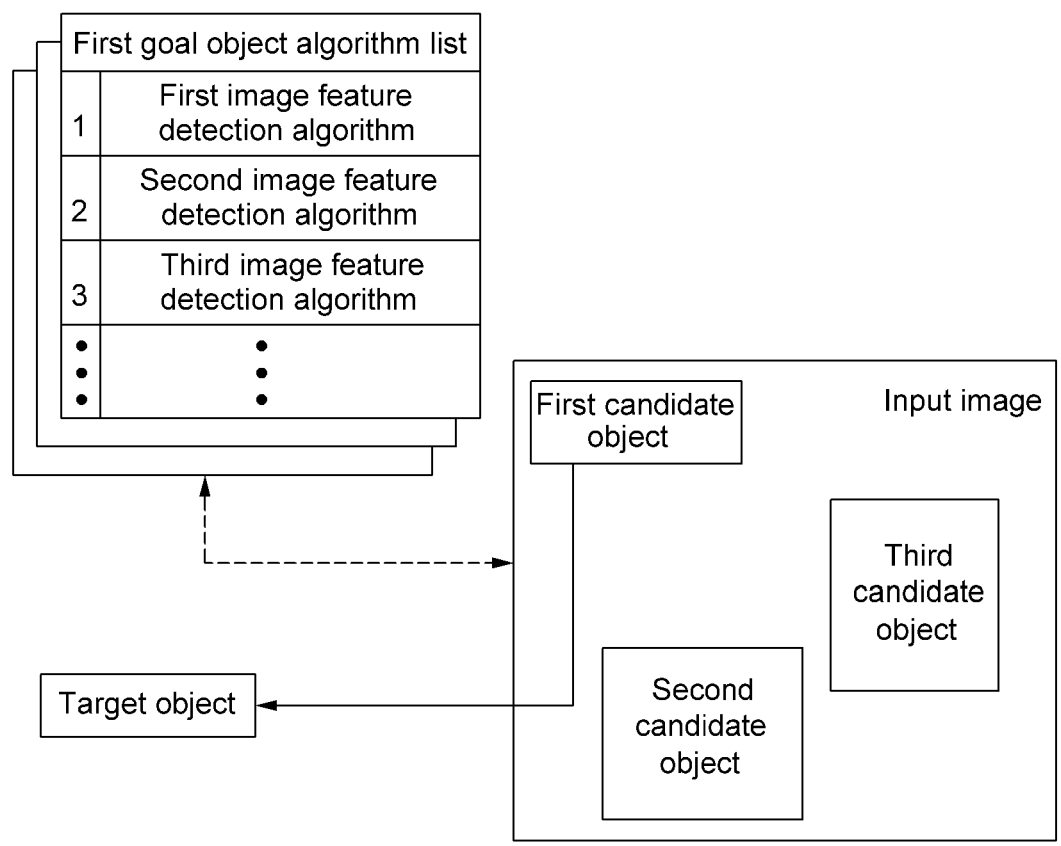
FIG. 5 illustrates a method for detecting a target object within an input image based on an algorithm list according to an embodiment of the present disclosure.

FIG. 5 illustrates a method for detecting a target object within an input image based on an algorithm list according to an embodiment of the present disclosure.

Also, referring to FIG. 5, the posture estimation application according to the embodiment may detect a target object in a predetermined input image based on a generated algorithm list S105.

Specifically, the posture estimation application according to the embodiment may detect, from a predetermined input image including at least one or more unspecified object (candidate object), a target object which is an object corresponding to a first goal object (for example, a predetermined marker, a pen, or a part of the human body (for example, hand)) for which posture estimation is to be performed.

In other words, the posture estimation application may detect a target object corresponding to the first goal object among at least one or more candidate objects within the input image.

At this time, the posture estimation application according to the embodiment may detect the target object within the input image in real-time based on the algorithm list for the first goal object.

More specifically, the posture estimation application according to the embodiment may retrieve a utility algorithm stored with the highest priority (that is, an algorithm with the fastest computational speed or an algorithm requiring the smallest number of computations according to the embodiment) among at least one or more utility algorithms stored sequentially in the algorithm list for the first goal object.

And the posture estimation application may perform an object detection process for detecting a target object within the input image based on the retrieved utility algorithm.

In this case, when the target object is not detected from the object detection process based on the retrieved utility algorithm, the posture estimation application according to the embodiment may re-perform the target object detection within the input image based on another utility algorithm within the algorithm list for the first goal object S107.

Specifically, the posture estimation application according to the embodiment may check whether a utility algorithm stored with the second-highest priority (in what follows, the next-order utility algorithm) exists after the utility algorithm retrieved and applied previously (namely, the utility algorithm stored with the highest priority) among at least one or more utility algorithms sequentially stored in the algorithm list for the first goal object.

Also, when the next-order utility algorithm exists in the algorithm list of the first goal object, the posture estimation application may retrieve the corresponding next-order utility algorithm from the algorithm list.

Also, the posture estimation application according to the embodiment may re-perform the object detection process for detecting a target object within the input image based on the retrieved next-order utility algorithm.

At this time, according to the embodiment, if the target object is not detected even from the re-performed object detection process, the posture estimation application may repeatedly perform the object detection process based on other next-order utility algorithms within the algorithm list of the first target object.

On the other hand, the posture estimation application according to the embodiment may terminate the corresponding object detection process if the target object is not detected even after the target object detection is repeated for all of the utility algorithms within the algorithm list of the first goal object.

Also, the posture estimation application may also terminate the corresponding object detection process when the next-order utility algorithm no longer exists within the algorithm list of the first goal object.

In other words, the posture estimation application according to the embodiment may retrieve utility algorithms stored sequentially in the algorithm list of the first goal object according to a predetermined criterion (computational speed and/or amount of computations according to the embodiment) one after another according to the order of storage and apply the retrieved utility algorithm to target object detection within an input image.

At this time, if a target object is not detected when the first target object detection based on the utility algorithm first retrieved from the algorithm list of the first goal object, the posture estimation application may perform the second, third, . . . , n-th target object detection based on the next-order utility algorithms within the algorithm list of the first goal object.

For example, when a corner point-based image feature detection algorithm, a HOG-based image feature detection algorithm, and a region-based image feature detection algorithm are sequentially stored in the algorithm list of the first goal object, the posture estimation application may retrieve the corner point-based image feature detection algorithm having the highest priority first and perform the first target object detection.

Now suppose a target object is not detected from the first target object detection. In that case, the posture estimation application may retrieve the HOG-based image feature detection algorithm, the next-order utility algorithm after the corner point-based image feature detection algorithm, and perform the second target object detection.

Also, suppose the target object is still not detected from the secondary target object detection. In that case, the posture estimation application may retrieve the region-based image feature detection algorithm, the next-order utility algorithm after the HOG-based image feature detection algorithm, and perform the third target object detection.

Afterward, the posture estimation application may terminate the object detection process for the corresponding input image if the target object is not detected even from the third target object detection.

In other words, the posture estimation application according to the embodiment may detect a target object corresponding to the first goal object from an input image by applying utility algorithms in the order of deemed priority in detecting the first goal object from the input image.

As described above, the posture estimation application may improve the detection rate of an object by applying an image feature detection algorithm optimized to the target object when detecting the target object for which posture is to be estimated.

Also, the posture estimation application may change and apply in real-time the image feature detection algorithm for detecting the target object for which posture is to be estimated, thereby guaranteeing detection accuracy and real-time operation even for a target object varying in real-time within an input image and also improving the efficiency of processing a computer vision algorithm.

Figure 6:
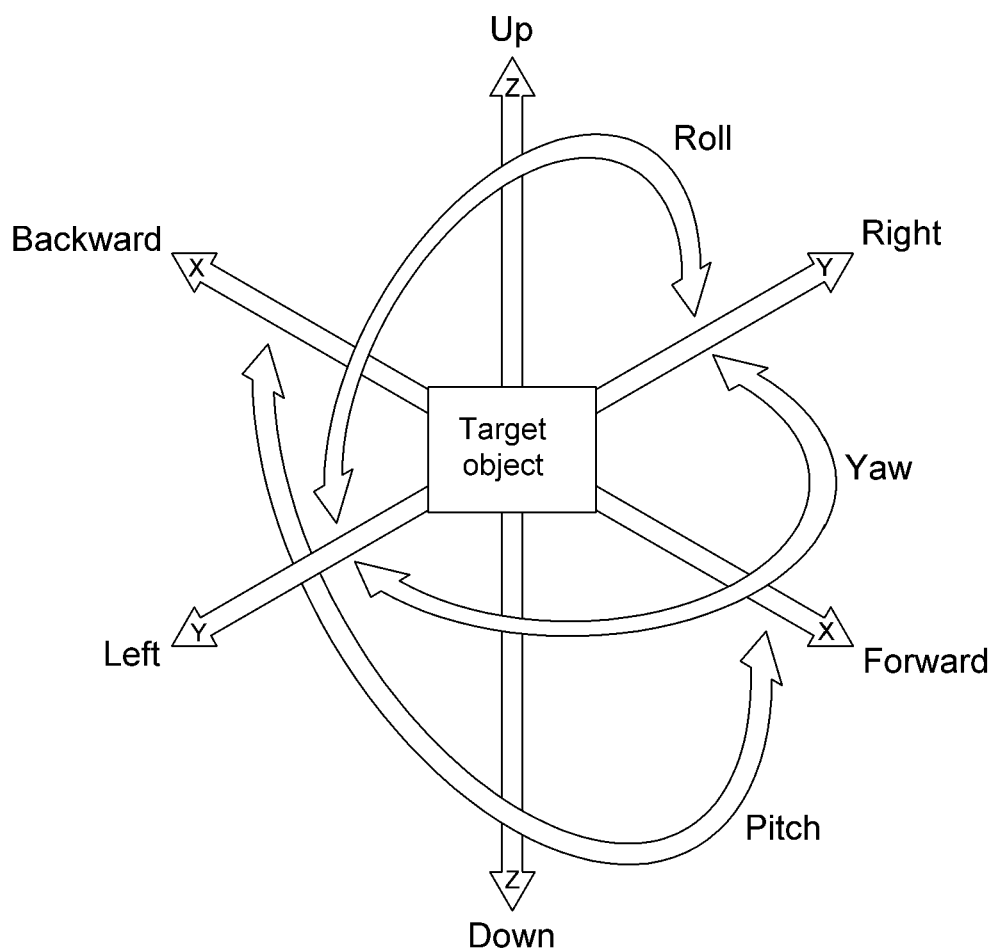
FIG. 6 illustrates a method for performing posture estimation on a target object according to an embodiment of the present disclosure.

FIG. 6 illustrates a method for performing posture estimation on a target object according to an embodiment of the present disclosure.

Meanwhile, referring to FIG. 6, when a target object is detected from an object detection process based on a utility algorithm within the algorithm list of the first goal object, the posture estimation application according to the embodiment may perform posture estimation on the detected target object S109.

Specifically, when a target object corresponding to a first goal object (for example, a predetermined marker, a pen, or a part of the human body (for example, hand)) is detected among a plurality of candidate objects within an input image, the posture estimation application may perform posture estimation for the target object based on the algorithm list for the first goal object.

More specifically, the posture estimation application according to the embodiment may perform posture estimation for the target object based on the utility algorithm used for the target object detection among at least one or more utility algorithms included in the algorithm list for the first goal object.

For example, when a target object (for example, a pen) within an input image is detected based on the first utility algorithm (for example, a cornet point-based image feature detection algorithm) within the algorithm list of the first goal object, the posture estimation application may perform a posture estimation process on the detected target object based on the first utility algorithm.

Here, the posture estimation according to the embodiment may refer to a process that measures rotational and translational motion elements of a predetermined object (a target object according to the embodiment) moving in the three-dimensional space based on a reference point, the position of the reference point, and/or 6 degrees of freedom (6 DoF) posture of the object.

Specifically, the reference point according to the embodiment may mean at least one or more points on the target object that act as a reference for estimating the posture of the target object.

In the embodiment, the reference point may be used as a reference parameter for the augmentation of a predetermined virtual object that interacts with a target object when a virtual object augmentation process is performed based on the corresponding target object.

For example, when the target object is a 'pen,' the reference point may be a point attached to the pen point, where augmented reality may be provided in a way that a virtual line according to the movement of the pen point is augmented with a virtual object.

In another example, when the target object is a 'knife,' the reference point may be a point attached to the knife tip, where augmented reality may be provided in a way that cutting of another object according to the movement of a blade edge of the knife is expressed as a virtual object.

Depending on the embodiments, since it is difficult to directly recognize the 6 DoF posture of a reference point of the target object from the image, the 6 DoF posture of the reference point may be estimated by recognizing a marker attached to the target object and determining the positional relationship between the marker and the reference point.

Also, the 6 DoF posture according to the embodiment may be posture estimation information obtained by measuring six rotational and translational motion elements of an object (a target object according to the embodiment) moving in the three-dimensional space.

Specifically, the 6 DoF according to the embodiment may be the information obtained by measuring left/right rotational motion (roll) around the X-axis, forward/backward rotational motion (pitch) around the Y-axis, and up/down rotational motion (yaw) around the Z-axis; and forward/back (surge), left/right (sway), and up/down (heave) translational motions in the three-dimensional cartesian coordinate system.

In other words, the posture estimation application according to the embodiment may obtain a reference point and 6 DoF posture of a target object based on the utility algorithm used for detection of the target object among at least one or more utility algorithms included in the algorithm list for the first goal object.

Also, the posture estimation application may estimate and provide the posture of the target object based on the reference point and the 6 DoF posture obtained as described above.

In other words, the posture estimation algorithm according to the embodiment may perform posture estimation of a target object within an input image based on the utility algorithm used for the detection of the corresponding target object and thus perform posture estimation by obtaining the 3-D position and 6 DoF posture of the target object.

As described above, the posture estimation application may implement faster data processing and improve the accuracy and reliability of the processing result by performing the posture estimation for the target object using at least one of the image feature detection algorithms optimized to the corresponding target object.

Also, the posture estimation application according to the embodiment may perform a posture verification process based on the result of the performed posture estimation S111.

Specifically, the posture estimation application according to the embodiment may perform a posture verification process that determines whether the accuracy of the posture estimation performed on a target object satisfies a predetermined criterion.

More specifically, the posture estimation application according to the embodiment may perform posture verification that determines whether the accuracy of a posture estimation result for a target object satisfies a predetermined criterion (for example, a preconfigured value) based on a re-projection error calculation process and/or an outlier (that is, a feature point causing a matching error) ratio calculation process based on the result of performed postured estimation.

Although the embodiment of the present disclosure assumes that the accuracy of posture estimation performed on a target object is verified based on the re-projection error calculation process and/or an outlier (that is a feature point causing a matching error) ratio calculation process, the embodiment of the present disclosure does not limit the algorithm itself performing posture verification, where, depending on the embodiments, posture verification may be performed based on other algorithms known to the public.

Also, the posture estimation application according to the embodiment may perform a different, predetermined process according to the result of the posture estimation performed as described above.

Specifically, when a result of posture estimation for a target object passes the posture verification process, the posture estimation application according to the embodiment may provide the corresponding posture estimation result (that is, a verified posture estimation result) in a predetermined manner S113.

In other words, when the accuracy of posture estimation performed on the corresponding target object is determined to satisfy a predetermined criterion from a result of posture verification for the target object, the posture estimation application according to the embodiment may provide the corresponding posture estimation result in a predetermined manner.

For example, when a result of posture estimation for a target object passes the posture verification process (in other words, when the accuracy of posture estimation is determined to satisfy a predetermined criterion), a virtual object corresponding to the target object may be displayed by being augmented on the corresponding input image based on the posture estimation result.

Meanwhile, when the result of posture estimation for a target object fails to pass the posture verification process, the posture estimation application according to the embodiment may re-perform target object detection within the input image based on other utility algorithms within the algorithm list for the first goal object S107.

In other words, when the accuracy of posture estimation performed on a target object is determined not to meet a predetermined criterion from a posture verification result for the corresponding target object, the posture estimation application according to the embodiment may re-perform target object detection within the input image based on other utility algorithms within the algorithm list for the first goal object.

Specifically, when a result of posture estimation based on a utility algorithm used for detection of a target object does not satisfy a predetermined criterion, the posture estimation application according to the embodiment may return to the process of detecting the target object within the corresponding input image based on the next-order utility algorithm other than the utility algorithm not satisfying the criterion.

In other words, when a specific utility algorithm within the algorithm list for the first goal object proves to be effective in a target object detection process but is determined to be ineffective for posture estimation of the target object, the posture estimation application again retrieves the next-order utility algorithm within the algorithm list to re-perform the target object detection process.

In other words, when a predetermined utility algorithm is determined to be effective for both the target object detection and the posture estimation process for the corresponding target object, the posture estimation application according to the embodiment may provide a result obtained based on the utility algorithm in a predetermined manner.

On the other hand, when a predetermined utility algorithm is ineffective in at least one of the target object detection and the posture estimation process for the corresponding target object, the posture estimation application may re-perform the process based on another utility algorithm (next-order utility algorithm) other than the former utility algorithm.

At this time, the posture estimation application according to the embodiment may check whether a utility algorithm stored with the second-highest priority exists after the utility algorithm retrieved and applied previously (namely, the utility algorithm stored with the highest priority) among at least one or more utility algorithms sequentially stored in the algorithm list for the first goal object.

When the next-order utility algorithm exists in the algorithm list of the first goal object, the posture estimation application may retrieve the corresponding next-order utility algorithm from the algorithm list.

Also, the posture estimation application may re-perform the subsequent process based on the retrieved next-order utility algorithm.

On the other hand, the posture estimation application according to the embodiment may terminate the target object-based posture estimation process when the next-order utility algorithm no longer exists within the algorithm list of the first goal object.

Also, the posture estimation application according to the embodiment may terminate the target object-based posture estimation process if at least one of the target object detection and the posture verification process does not meet a predetermined criterion even after the target object detection and the posture verification process are performed for all of the utility algorithms within the algorithm list of the first goal object.

As described above, the posture estimation application may determine whether an image feature detection algorithm used for posture estimation is effective for a target object by verifying the accuracy of the posture (in the embodiment, 6 DoF posture) estimated for the corresponding target object; provide a result of the corresponding posture estimation according to the result in a predetermined way or re-perform a process that includes detection, posture estimation, and posture verification of the target object based on another algorithm other than the image feature detection algorithm used for the posture estimation; and provide posture estimation information derived based on the image feature detection algorithm optimized to the corresponding target object, thereby improving the quality of processing an object-customized posture estimation service and the accuracy of the service processing result.

As described above, a method and a system for object detection and posture estimation based on an object-customized image feature detection algorithm according to an embodiment of the present disclosure may learn an image feature detection algorithm optimized for a predetermined object and perform image processing on the object within an input image based on an image feature extraction technique optimized for the corresponding object.

Also, a method and a system for object detection and posture estimation based on an object-customized image feature detection algorithm according to an embodiment of the present disclosure may perform data processing quickly based on automated analysis of objects within an input image by performing real-time object detection and posture estimation within the input image based on the learned algorithm, thereby improving accuracy and reliability of the data processing.

Also, a method and a system for object detection and posture estimation based on an object-customized image feature detection algorithm according to an embodiment of the present disclosure may guarantee accuracy and real-time operation of the detection even if a target object changes in real-time within an input image and also improve the corresponding detection rate by performing object detection and posture estimation within the input image by changing the image feature detection method in real-time according to various objects based on the learned algorithm, thereby improving the processing efficiency of a computer vision algorithm.

Also, the embodiments of the present disclosure described above may be implemented in the form of program commands which may be executed through various types of computer constituting elements and recorded in a computer-readable recording medium. The computer-readable recording medium may include program commands, data files, and data structures separately or in combination thereof. The program commands recorded in the medium may be those designed and configured specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be replaced with one or more software modules to perform the processes of the present disclosure, and vice versa.

Specific implementation of the present disclosure are embodiments, which does not limit the technical scope of the present disclosure in any way. For the clarity of the disclosure, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of the present disclosure but has to be defined by the appended claims.

What is claimed is:

1. A system for object detection and posture estimation, the system comprising:
at least one or more processors; and
at least one or more memories,
wherein at least one application, as an application that is stored in the memory and performs object detection and posture estimation based on an object-customized image feature detection algorithm by being executed by the at least one or more processors,
learns a goal object based on a plurality of image feature detection algorithms,
generates an algorithm list that includes evaluation of the plurality of image feature detection algorithms for detecting the learned goal object,
detects a target object corresponding to the goal object among at least one or more candidate objects within an input image based on the generated algorithm list, and
performs a posture estimation process for the detected target object based on the generated algorithm list,
wherein the feature detection algorithm analyzes a pattern of the goal object and selectively learns local image feature points and image feature point descriptors based on the appearance of the goal object,
wherein the application learns the goal object by performing a utility evaluation process based on the plurality of image feature detection algorithms and the goal object.

2. The system of claim 1, wherein the utility evaluation is a process for determining, based on each image feature detection algorithm, whether the number of image features obtained when the object detection process and the posture estimation process based on the goal object are performed and the distribution of the image features satisfy a predetermined criterion.

3. The system of claim 2, wherein, when the number of image features and the distribution of the image features satisfy a predetermined criterion, the application determines an image feature detection algorithm satisfying the predetermined criterion as a utility algorithm for the goal object.

4. The system of claim 3, wherein, as the number of image features increases and the distribution of the image features becomes more uniform, the application determines the corresponding image feature detection algorithm as an algorithm with higher utility for the goal object.

5. The system of claim 4, wherein the application generates the algorithm list by storing at least one or more utility algorithms determined as having utility for the goal object sequentially according to a predetermined criterion.

6. The system of claim 5, wherein the application generates the algorithm list by sequentially storing the utility algorithms based on at least one criterion between computational speed and amount of computations.

7. The system of claim 6, wherein the application performs the object detection process by sequentially retrieving the at least one or more utility algorithms within the algorithm list.

8. The system of claim 7, wherein, when a first utility algorithm that performs an object detection process first from the algorithm list does not detect the target object, the application re-performs the object detection process based on the next-order utility algorithm after the first utility algorithm within the algorithm list.

9. The system of claim 3, wherein the posture estimation process measures rotation and translation motion elements of the target object moving in the three-dimensional space based on at least one or more of a reference point of the target object, the position of the reference point, and 6 degrees of freedom (DoF) posture.

10. The system of claim 9, wherein the application performs a posture verification process that verifies a result of the posture estimation process,
performs a predetermined process according to the result of the posture verification process, and
performs the posture estimation process based on a utility algorithm used when the object detection process is performed.

11. The system of claim 10, wherein, when the result of the posture verification process satisfies a predetermined criterion, the application provides a virtual object that interacts and is augmented according to the posture of the target object obtained based on the posture estimation process.

12. The system of claim 10, wherein, when the result of the posture verification process does not satisfy a predetermined criterion, the application re-performs the object detection process by retrieving, from the algorithm list, the next-order utility algorithm after a utility algorithm used to perform the object detection process.

13. A method for object detection and posture estimation based on an object-customized image feature detection algorithm performed by an application executed in a computing device, the method comprising:
- obtaining an algorithm list that includes evaluation information on a plurality of image feature detection algorithms for detecting a goal object to be detected;
- detecting a target object, an object corresponding to the goal object, among at least one or more candidate objects within an input image based on the obtained algorithm list;
- performing a posture estimation process on the detected target object based on the obtained algorithm list; and
- providing an augmented reality environment by augmenting a virtual object according to an estimated posture of the target object,
- wherein the feature detection algorithm analyzes a pattern of the goal object and selectively learns local image feature points and image feature point descriptors based on the appearance of the goal object,
- wherein the obtaining an algorithm list that includes evaluation information on a plurality of image feature detection algorithms for detecting a goal object to be detected learns the goal object by performing a utility evaluation process based on the plurality of image feature detection algorithms and the goal object.

* * * * *